US012748018B2

(12) United States Patent
Longo et al.

(10) Patent No.: US 12,748,018 B2
(45) Date of Patent: Sep. 29, 2026

(54) APPARATUS AND METHOD FOR AUTOMATICALLY TESTING AN INFOTAINMENT SYSTEM OF A MOTOR-VEHICLE

(71) Applicant: Comau S.p.A., Grugliasco (IT)

(72) Inventors: Nicola Longo, Grugliasco (IT); Giovanni Di Stefano, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 276 days.

(21) Appl. No.: 18/723,582

(22) PCT Filed: Dec. 22, 2022

(86) PCT No.: PCT/IB2022/062684

§ 371 (c)(1),
(2) Date: Jun. 24, 2024

(87) PCT Pub. No.: WO2023/126795

PCT Pub. Date: Jul. 6, 2023

(65) Prior Publication Data

US 2025/0060285 A1 Feb. 20, 2025

(30) Foreign Application Priority Data

Dec. 28, 2021 (IT) ........................ 102021000032777

(51) Int. Cl.

| | |
|---|---|
| ***G01M 99/00*** | (2011.01) |
| ***B25J 9/16*** | (2006.01) |
| ***G06T 7/73*** | (2017.01) |

(52) U.S. Cl.

CPC ......... *G01M 99/008* (2013.01); *B25J 9/1612* (2013.01); *B25J 9/1697* (2013.01); *G06T 7/73* (2017.01); *G06T 2207/30204* (2013.01)

(58) Field of Classification Search

CPC ....... G01M 99/008; G06T 2207/30204; G06T 7/73; B25J 9/1612; B25J 9/1697

See application file for complete search history.

(56) References Cited

U.S. PATENT DOCUMENTS

| | | | |
|---|---|---|---|
| D769,343 | S | 10/2016 | Bordegnoni et al. |
| D834,082 | S | 11/2018 | Bordegnoni et al. |
| 11,440,191 | B2 | 9/2022 | Bordegnoni et al. |
| 2014/0309775 | A1 | 10/2014 | Jenkinson |
| 2016/0271801 | A1 | 9/2016 | Seong |
| 2017/0334076 | A1 | 11/2017 | Bordegnoni et al. |

(Continued)

FOREIGN PATENT DOCUMENTS

| | | | |
|---|---|---|---|
| CN | 110 826 426 | A | 2/2020 |
| DE | 102019128264 | B3 | 2/2021 |

(Continued)

*Primary Examiner* — Stephanie E Bloss
*Assistant Examiner* — Diana Hancock

(57) ABSTRACT

An apparatus and method for automatically testing an infotainment system of a motor-vehicle. The apparatus includes, and the method is configured to use, a first multi-axis articulated robot including a chain of connected robot elements which are mutually articulated and ending with a robot wrist, and a second multi-axis articulated robot mounted on the wrist of the first robot. Wherein the second robot is configured for entering into a passenger compartment of the motor-vehicle to automatically test the infotainment system.

20 Claims, 7 Drawing Sheets

(56) References Cited

U.S. PATENT DOCUMENTS

| | | | | |
|---|---|---|---|---|
| 2018/0194008 | A1 * | 7/2018 | Namiki | G06T 7/80 |
| 2022/0410394 | A1 * | 12/2022 | Leong | B25J 9/1671 |
| 2025/0178199 | A1 * | 6/2025 | Longo | B25J 9/1676 |

FOREIGN PATENT DOCUMENTS

| | | | | |
|---|---|---|---|---|
| EP | 3711909 | A2 * | 9/2020 | B25J 9/1697 |
| JP | H07232270 | A | 9/1995 | |
| WO | WO-2017051263 | A2 * | 3/2017 | G06F 11/2221 |
| WO | 2021/042332 | A1 | 3/2021 | |

* cited by examiner

APPARATUS AND METHOD FOR AUTOMATICALLY TESTING AN INFOTAINMENT SYSTEM OF A MOTOR-VEHICLE

CROSS-REFERENCE TO RELATED APPLICATION(S)

This application is filed pursuant to 35 U.S.C. § 371 claiming priority benefit to PCT/IB2022/062684 filed Dec. 22, 2022, which claims priority benefit to Italian Patent Application No. 102021000032777 filed Dec. 28, 2021, the contents of both applications are incorporated herein by reference in their entirety for all purposes.

TECHNICAL FIELD

The present invention relates to an apparatus for automatically testing an infotainment system of a motor-vehicle.

BACKGROUND

The expression "infotainment system" means an information and entertainment system integrated in an instrument panel mounted on the dashboard of a motor-vehicle, comprising, for example, a multimedia system equipped with a responsive touch screen device including various multimedia contents (radio, satellite navigator, digital air conditioning system controls, smartphone interface, etc.).

An apparatus of the type indicated above is, for example, described in the document US 2016/0271801 A1. In fact, this document describes an inspection system for a motor-vehicle, in particular, for testing various components, such as, for example, buttons associated with the steering and a touch screen. This system comprises actuator means for operating the components to be tested, and an ultrasound transducer for detecting the distance of the system from the components to be tested.

SUMMARY

The present invention starts from the desire to create an apparatus for automatically testing an infotainment system of a motor-vehicle which allows improvement of the flexibility and efficiency of the execution of the test operations, arranging preliminary calibration operations which are simple and intuitive, and which allow multiple test operations to be performed on the infotainment system that are highly accurate and repeatable.

The object of the present invention is, therefore, that of overcoming the aforesaid drawbacks, producing an apparatus for automatically testing an infotainment system of a motor-vehicle, which has characteristics of high flexibility and efficiency.

An additional object of the invention is that of creating an apparatus for automatically testing an infotainment system of a motor-vehicle which allows a plurality of test operations to be performed on the infotainment system, regardless of the type of motor-vehicle on which the system is mounted, directly in the passenger compartment, without having to set up specific test benches of the infotainment system and/or remove motor-vehicle parts to proceed with the test operations.

A further object of the invention is that of creating an apparatus for automatically testing an infotainment system of a motor-vehicle above which is extremely intuitive for the operators, providing an automatic preliminary calibration system which is particularly simple to implement.

With a view to achieving these objects, the invention relates to a method for automatically testing an infotainment system of a motor-vehicle comprising the following steps:

providing an apparatus comprising:

a first multi-axis articulated robot comprising a chain of robot elements mutually articulated together and ending with a robot wrist, a second multi-axis articulated robot mounted on the wrist of the first robot, wherein said second robot is configured for entering into the passenger compartment of the motor-vehicle, actuation means supported by said second robot, configured for performing a plurality of actuation operations of the infotainment system of the motor-vehicle, wherein said actuation means comprise elements provided for interacting with a touch screen of the infotainment system, at least one video camera arranged on-board the second robot, configured to acquire data inside the passenger compartment of the motor-vehicle, during an execution step of the infotainment system test operations, an electronic control unit, said method comprising driving an implementation step including a sequence of operations to be performed on the infotainment system by means of said actuation means, wherein said second robot enters into the passenger compartment of the motor-vehicle, to access the infotainment system to be tested, in such a way that said apparatus is configured to perform a plurality of test operations of the infotainment system directly inside the passenger compartment of the motor-vehicle, without having to provide test benches for the infotainment system and/or remove motor-vehicle parts to access the infotainment system.

The invention also relates to an apparatus according to claim 13.

Further characteristics and advantages of the invention are indicated in the dependent claims.

BRIEF DESCRIPTION OF THE DRAWINGS

Further characteristics and advantages of the invention will become apparent from the description that follows with reference to the attached drawings, provided purely by way of non-limiting example, wherein.

DETAILED DESCRIPTION

In the following description various specific details are illustrated aimed at a thorough understanding of examples of one or more embodiments. The embodiments can be implemented without one or more of the specific details, or with other methods, components, materials, etc. In other cases, known structures, materials, or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

The drawings show, by way of example, an apparatus 1 according to the invention, arranged for automatically testing an infotainment system of a motor-vehicle V. The expression "infotainment system" refers to an information and entertainment system integrated into an instrument panel mounted on the dashboard of a motor-vehicle, comprising, for example, a multimedia system equipped with a touch screen including various multimedia contents (radio, satellite navigator, digital air conditioning system controls, smartphone interface, etc.).

Figure 1:
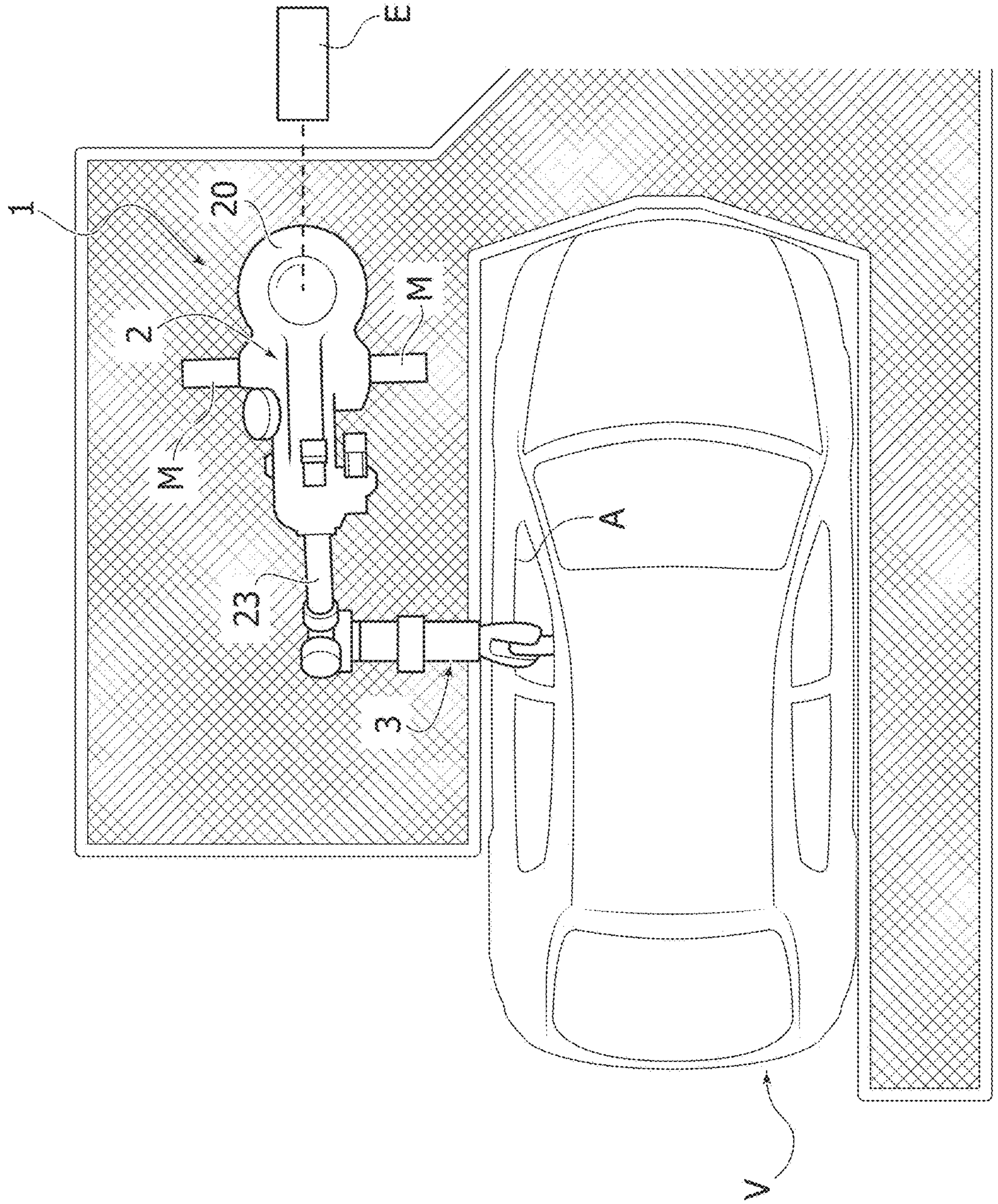
FIG. 1 is a schematic elevation view illustrating a preferred embodiment of the invention.
Figure 2C:
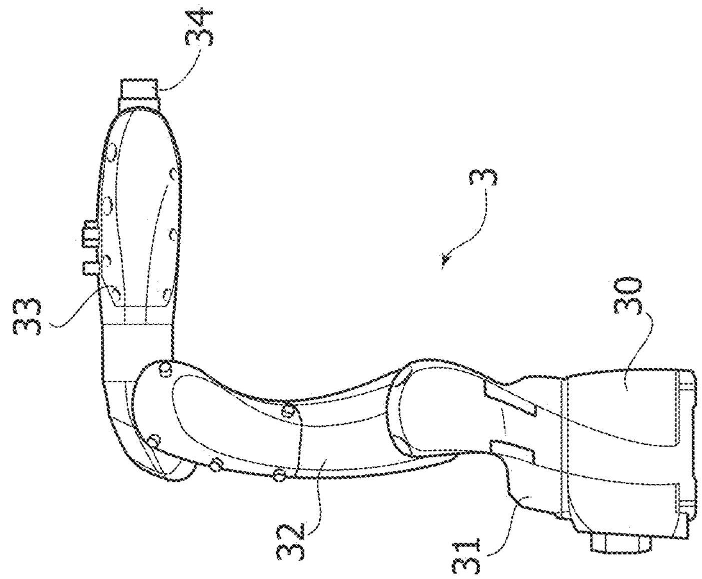
FIGS. 2A-2C illustrate different components configured to support sensorized means for testing the infotainment system.
Figure 2B:
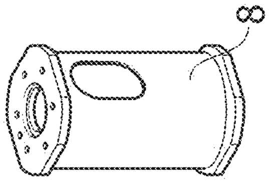
Figure 2A:
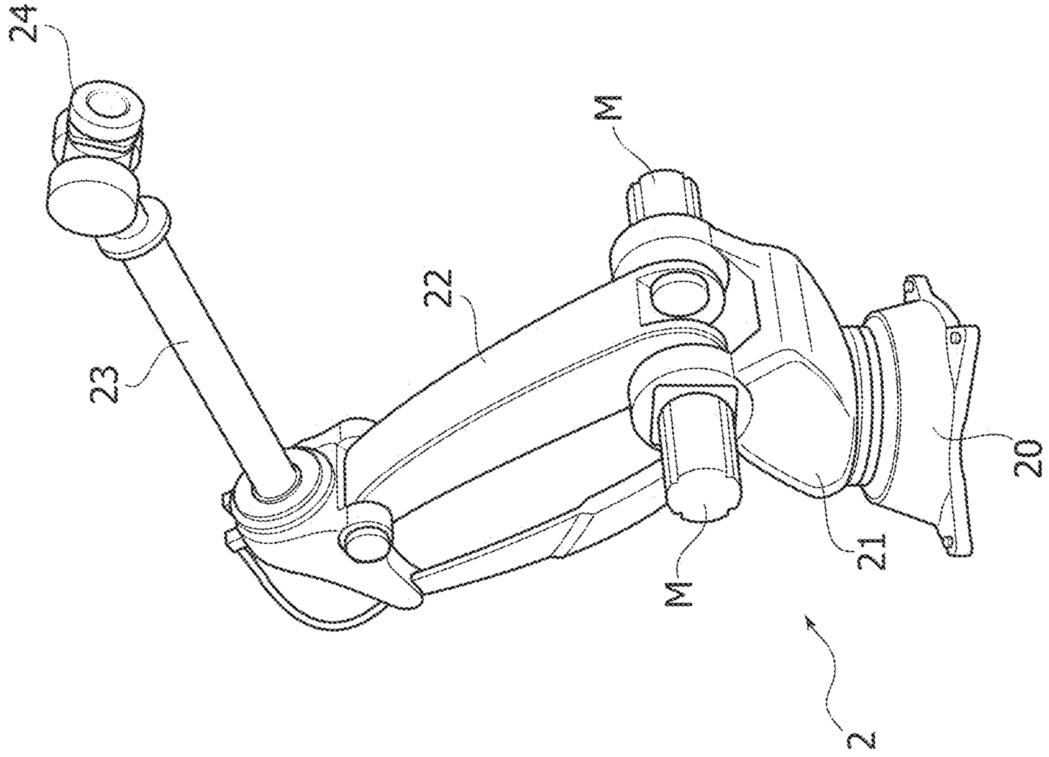
Figure 5:
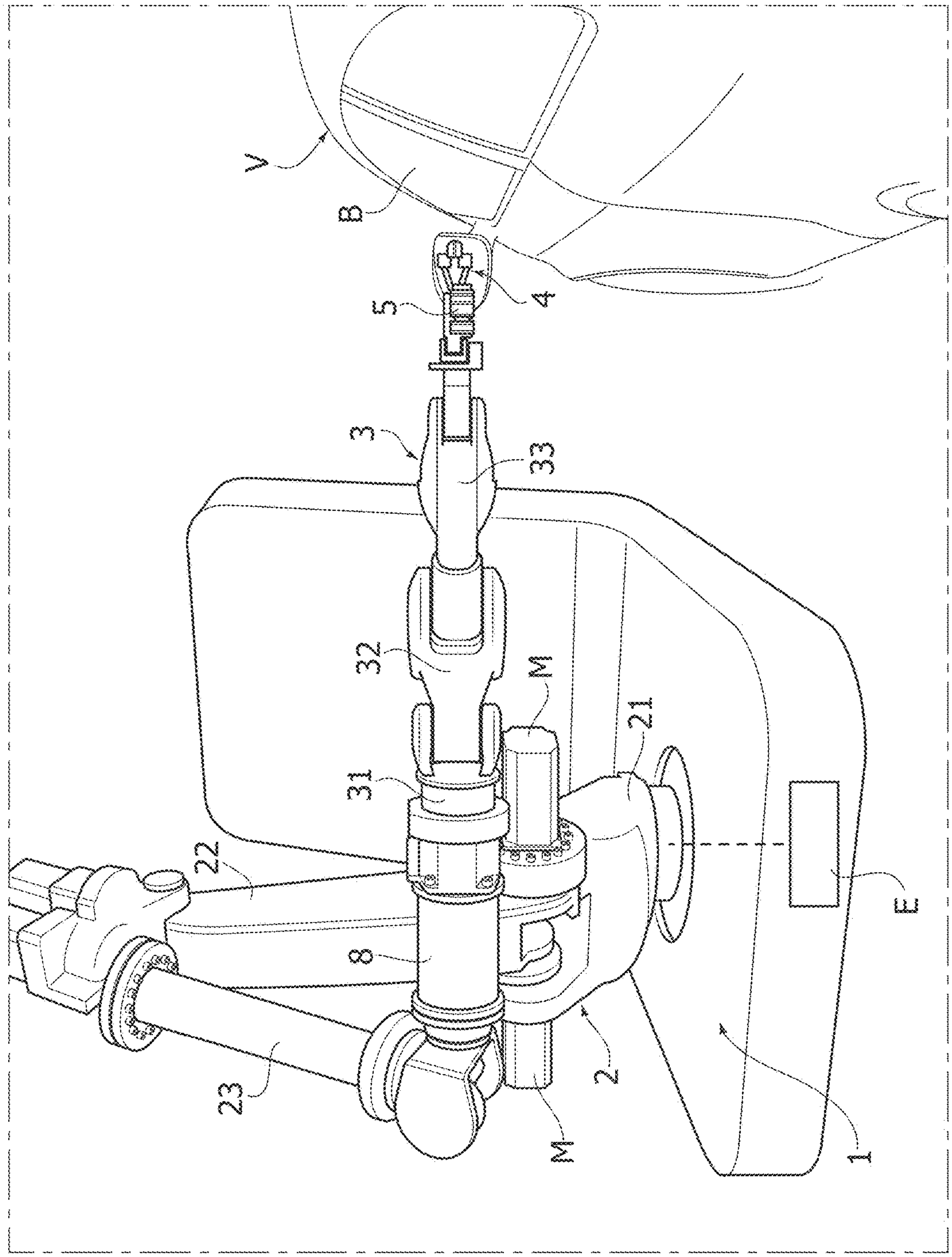

In FIGS. 1, 2A, 5, numeral 2 indicates in its entirety a first multi-axis articulated robot 2 comprising a base 20 and a chain of robot elements mutually articulated together and ending with a robot wrist 24 provided with a flange 8 for connecting an additional robotic assembly.

In one or more embodiments, the first multi-axis articulated robot 2 comprises a base 20 and a column 21 mounted for rotation on the base about a first vertically directed axis. The first articulated robot 2 has an arm 22 mounted articulated on the column 21 about a second axis directed horizontally; reference 23 indicates a forearm mounted on the aforesaid arm 22. The forearm 23 is articulated about a third axis, which is also directed horizontally; the forearm 23 also has the possibility of rotating about its longitudinal axis. The forearm 23 of the robot 2 is provided at its end with a wrist 24 mounted with the possibility of rotating about two mutually orthogonal axes. According to a per se known technique, each of the six axes of the first robot 2 is controlled by a respective electric motor M. The electric motors M of the robot 2 are controlled in a per se known manner by an electronic control system. A flange 8 is provided at the distal end of the wrist 24 of the first robot 2 for connecting another robotized assembly.

As illustrated in FIGS. 1, 2C, 5, the apparatus 1 comprises a second multi-axis articulated robot 3 mounted on the wrist 24 of the first articulated robot 2. The second robot 3 comprises a base element 30 and a chain of robot elements 31, 32, 33 mutually articulated together and ending with a wrist 34 provided with a flange for connecting a functional assembly arranged to carry out the test operations on the motor-vehicle infotainment system V.

The mobile parts of the robots 2, 3 are connected to each other by joints of known type, having the respective electric motors, some indicated with M, associated with relative gear reduction transmission. With the aforesaid joints, or rather, with the relative motors M, relative transducers are preferably associated (not indicated) for example, of the encoder or resolver type, for position control. The movements of the robots 2, 3, or rather, the operation of the motors and joints, are managed by an electronic control system, which is preferably located in a remote position with respect to the robots 2, 3 and is connected to the electrical/electronic parts of the latter through the conductors of a wiring.

Of course, the structure and configuration of the robots 2, 3 may be of any known type. For this reason, the construction details, such as for example the motors that drive the movements of the various elements and the electronic control system of the robots are not described or illustrated here, also because elimination of these details in the drawings makes them more ready and easy to understand.

As will be evident from the following description, the second robot 3 is preferably configured to pass through the opening A of the side window B of the motor-vehicle V on which it is intended to proceed with the test operations (FIGS. 1, 6), without having to open the side door of the motor-vehicle. For this reason, in accordance with the example illustrated in the attached drawings, the second articulated robot 3 is smaller than the first robot 2. In other words, the first robot 2 is arranged to support and guide the second robot 3 inside the passenger compartment of the motor-vehicle V on which the infotainment system to be tested is mounted.

Preferably, the second robot 3 is of the "collaborative" type, being provided at least in part with a sensorized cover that integrates sensor means, which can include contact sensor means, suitable for detecting a contact or an impact between the robot 3 and a foreign body, and/or proximity sensor means, suitable for detecting the presence of a foreign body within a substantially predetermined distance with respect to the manipulator robot, for example comprised between 0 and 15-20 cm. In various preferred embodiments, the cover integrates both contact sensor means and proximity sensor means.

The sensorized cover may comprise a plurality of cover modules which can be composed or assembled together, to form as a whole a sort of body that covers at least part of the mobile structure of the manipulator robot 3.

According to an essential characteristic of the invention, the apparatus 1 comprises actuation means 4 mounted on the wrist 34 of the second robot 3, arranged to perform a plurality of actuation operations of the infotainment system of the motor-vehicle V, simulating the action of the operator hand to test the system. In this regard, the actuation means 4 may comprise sensorized/haptic elements or with load cells, arranged to "touch" a capacitive touch screen of the infotainment system, selecting various icons/commands.

Figure 3C:
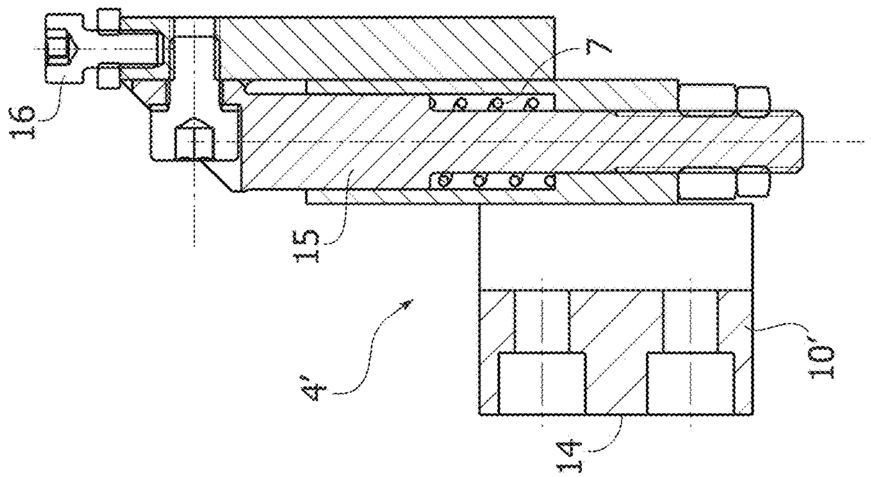
FIG. 3C is a cross-sectional view of the sensorized means illustrated in FIG. 3B.
Figure 3B:
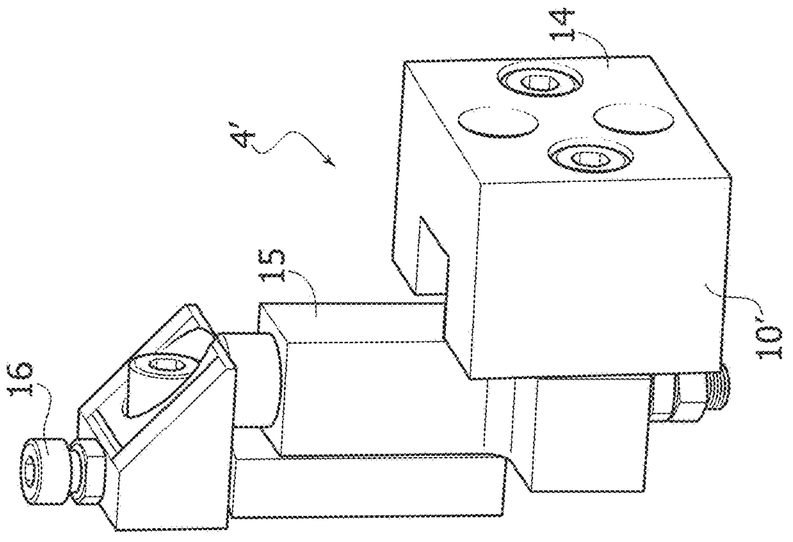
FIGS. 3A-3B illustrate different embodiments of sensorized means for testing the infotainment system.
Figure 3A:
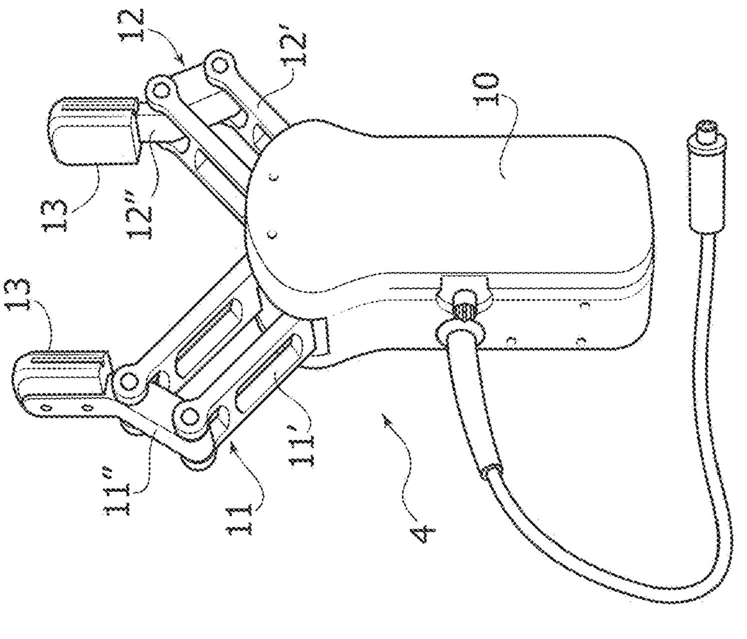

FIGS. 3A-3C illustrate different embodiments of the actuation means 4, 4' connected to the wrist 34 of the second robot 3 and arranged to stimulate the infotainment system and carry out a specific test cycle.

In accordance with what is illustrated in FIG. 3A, the actuation means 4 comprise a supporting body 10 connected to the wrist of the second robot 3. From the supporting body 10 a pair of robotic fingers 11, 12 extend at a distal end, wherein each finger 11, 12 supports a terminal element 13 equipped with a covering film configured to touch/scroll on the screen of the infotainment system. Preferably, the robotic fingers 11, 12 are arranged in a position of mutual symmetry with respect to a main axis of the sensorized means 4. Preferably, the robotic fingers 11, 12 each have a first element 11', 12' connected to the supporting body 10 and a second element 11'', 12'' connected in an articulated way to the first element 11', 12' and carrying said terminal element 13. It should be noted that the terminal elements 13 can be joined by providing a single central actuation element. The fingers 11, 12 are also arranged for gripping objects in the passenger compartment and/or pressing buttons, control elements on the dashboard.

FIGS. 3B, 3C illustrate a further embodiment of the actuation means (indicated with reference 4'), according to a perspective view and a cross-sectional view. The actuation means 4' comprise a supporting body 10' comprising a connecting portion 14' for connection to the wrist 34 of the robot 3 (for example, by means of a connection flange). A support arm 15 extends from the supporting body 10', on which a terminal element 16 is mounted at a distal end, designed to stress the infotainment system to be tested. In accordance with what is illustrated in FIGS. 3B, 3C, the terminal element 16 is a cylindrical element covered with a plastic material capable of facilitating the interaction with the infotainment system.

As illustrated in the cross-sectional view 3C, a spring element 7 is arranged within the support arm 15, elastically yielding and arranged axially along the support arm 15, arranged to cooperate with the terminal element 16 during interaction with the infotainment system, so as to accompany the terminal element 16 during the contact steps.

According to the invention, the apparatus 1 is configured to perform test operations, not only of the infotainment system, but also of other components present inside the passenger compartment of the motor-vehicle (dashboard buttons, adjustment sliders, etc.). Also for this reason, the actuation means 4 may vary with respect to what is illustrated in the attached drawings, arranging sensorized elements of different shapes, numbers and sizes.

According to a unique characteristic of the invention, the apparatus 1 comprises at least one video camera 5 arranged on board the second articulated robot 3, configured to acquire data inside the passenger compartment of the motor-vehicle V, during a preliminary calibration step of the apparatus 1 and/or during an execution step of the tests on the infotainment system. In one or more embodiments, the video camera 5 may be mounted close to the wrist 34 of the second robot 3, for example, mounted on the supporting body 10, 10' of the actuation means 4.

Figure 4:
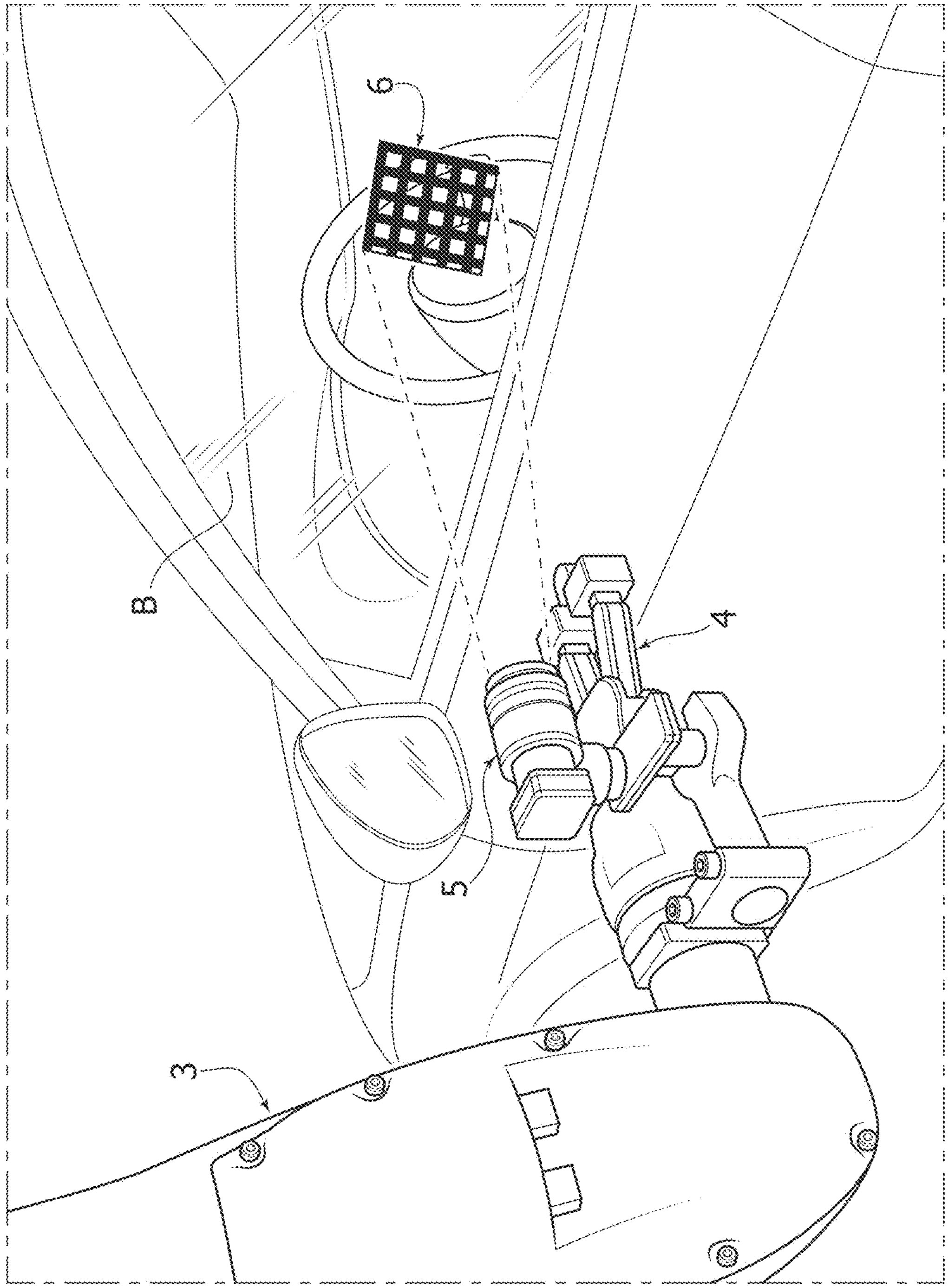
FIGS. 4-7 illustrate different operating steps of the test operations of the infotainment system, according to the apparatus and the method of the present invention.
Figure 7:
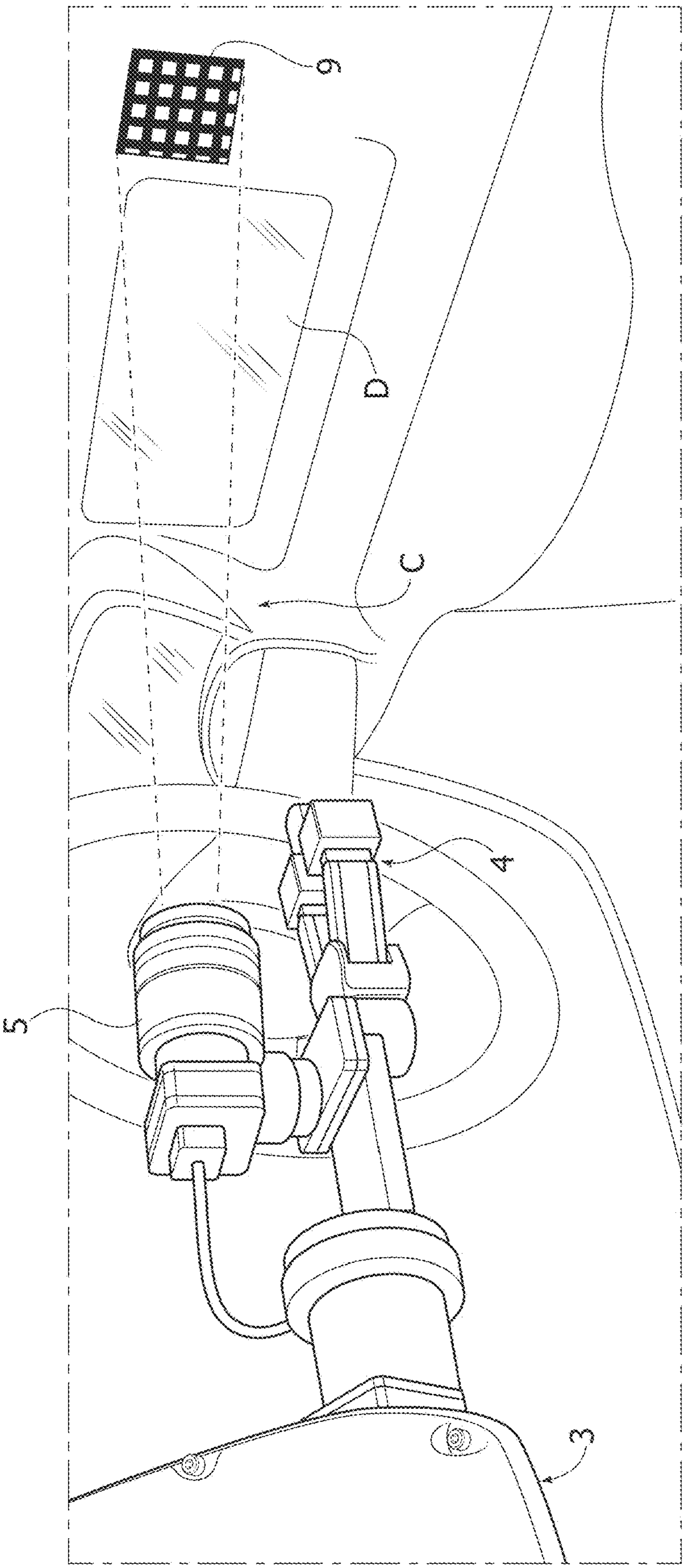

In one or more embodiments, the apparatus 1 also comprises at least one marker recognition element 6 arranged at a predetermined position of the motor-vehicle V (FIG. 4). The recognition element 6 can be viewed by the aforesaid at least one video camera 5 to perform preliminary calibration steps of the apparatus 1. It should be noted that the recognition element 6 may be made in the form of a specific two-dimensional shape automatically recognizable by the camera 5 or a QR code readable by the camera 5, which can be applied to the motor-vehicle V by means of an adhesive layer. As will become clear from the following description, the apparatus 1 may comprise further recognition elements 9, for example, applied on the dashboard C of the vehicle V (FIG. 7).

In one or more embodiments, said preliminary calibration step is carried out with the aid of CAD software including the mathematics of the motor-vehicle and of the infotainment system to be tested.

According to the invention, the apparatus 1 comprises an electronic control unit E (illustrated schematically in FIG. 1), configured to control the operations of the apparatus 1, and in particular to control in sequence:

- a preliminary definition step of the characteristics of the apparatus 1 and of the infotainment system of the vehicle V to be tested,
- a preliminary calibration step wherein the positions of the vehicle V and of the infotainment system are stored with respect to the first and second robots 2, 3, and
- a test execution step, wherein the second robot 3 is guided within the opening A of the side window B of the vehicle V, wherein the second robot 3 performs a predetermined sequence of test operations on the infotainment system.

According to another characteristic of the invention, the apparatus 1 comprises an operation control panel—HMI—arranged to control the various operating steps of the apparatus 1. Preferably, the panel is configured to display various icons that group together the set of operations that can be performed, dividing the operations according to two main sets, in particular control operations of the robot 2, 3 outside the motor-vehicle V and control operations of the robot 2, 3 inside the motor-vehicle V.

According to a unique characteristic of the invention, during operation, the robots 2, 3 can be controlled in a given position prior to entering the passenger compartment of the vehicle. In this configuration prior to entering the passenger compartment (with the second robot 3 guided into the opening A of the side window), the mobile parts of the robots 2, 3 are oriented so that the second robot 3 presents the chain of articulated elements 32, 33 aligned axially and oriented perpendicularly to the side of the motor-vehicle V, in the direction of the entry point determined by the opening A of the side window B of the motor-vehicle V (configuration shown in FIG. 5).

In one or more embodiments, the coordinates of this position prior to insertion into the motor-vehicle V are determined following a preliminary calibration procedure explained below. Of course, before proceeding with the subsequent commands to enter the passenger compartment, an operator must ensure that the side window B of the motor-vehicle V is completely open before proceeding with the further positioning commands.

Figure 6:
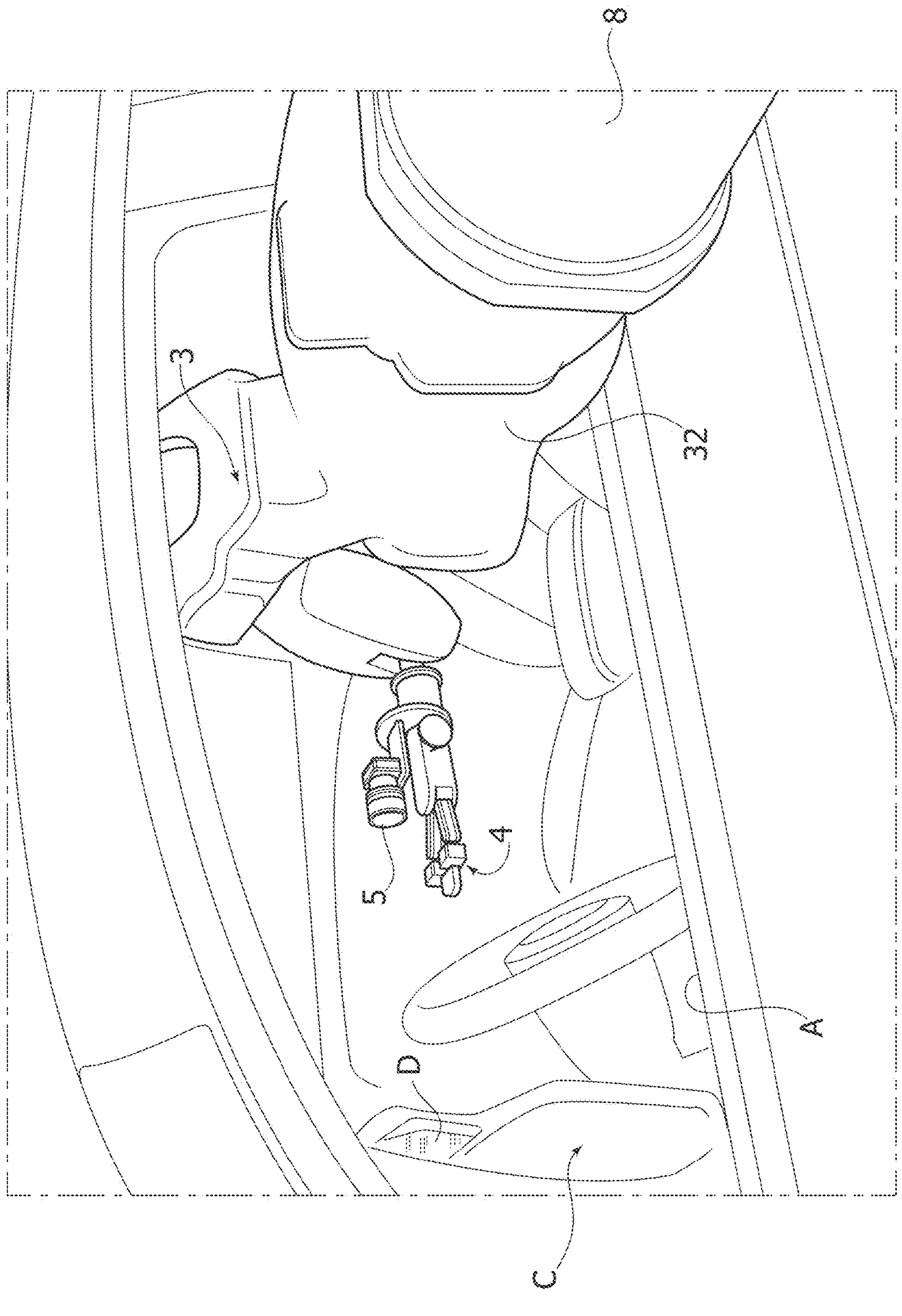

Once the robot 3 is oriented perpendicular to the side of the motor-vehicle V, an operator may control a subsequent operating position—for example via the HMI panel—wherein the second robot 3 is moved inside the passenger compartment up to a position wherein the actuation means 4 are close to a display D of the infotainment system (FIG. 6). Also in this case, the angles and the distance from the infotainment system integrated in the dashboard C are determined following a preliminary calibration operation detailed below in the description.

When the apparatus 1 is in the position proximal to the system to be tested, an operator may initiate a command for the execution of a plurality of test operations. The typology of the test operations is already in the memory of the control unit E, according to predetermined or previously customized sets.

As previously indicated, the electronic control unit E is configured to command in sequence:

- preliminary configuration operations, wherein the characteristics of the various components of the apparatus 1 are defined (for example, the types of robots 2, 3, the configuration of the video cameras) and the characteristics of the infotainment system to be tested (motor-vehicle model, type of system installed);
- preliminary calibration operations, wherein the different angles and positions that the robots 2, 3 must assume during the execution test steps are stored; and
- test operations, wherein all the test operations are carried out including predetermined sequences of operations to be carried out on the infotainment system.

According to another characteristic of the invention, during the execution of the test operations, the apparatus 1 is configured to acquire data (for example, acquiring photos and/or videos by means of said at least one video camera 5), and to trace the test operations by automatically generating various explanatory reports of the results of the test operations which will be sent to some analyst operators, to evaluate any anomalies in the infotainment system. Such reports may comprise:

videos generated inside the passenger compartment by a camera;

photos taken by a camera, together with the saving of the result of some processing (the result of the search for a logo/text on the screen, etc.);

internal system log results, comprising names and results of performed actions;

any additional software logs, such as the tracing of the signals of the CAN network of the vehicle.

The set of preliminary configuration operations—wherein the characteristics of the various components of the apparatus 1 are defined—may comprise the step of specifying the number and type of video cameras that are used during the tests. As previously indicated, a first video camera 5 is arranged on board the second robot 3 and is guided to acquire data during the test steps inside the passenger compartment. In one or more embodiments, the video camera 5 may be mounted close to the wrist 34 of the second robot 3, for example, mounted on the supporting body 10, 10' of the actuation means 4. Preferably, a second video camera (not shown) may be statically positioned outside the passenger compartment of the motor-vehicle V, to acquire additional data during the test steps (for example the movement of the robotic arms of the robots 2, 3).

According to another characteristic of the invention, the electronic control unit E has a plurality of test-cases in its memory, or rather, a plurality of compositions of actions which the robots 2, 3 will have to execute during a test operating step of the infotainment system. In this regard, the set of preliminary configuration operations may comprise the step of defining a new test case—completely from scratch—comprising a new sequence of operations to be implemented. The step of redefining a new test case may be carried out through an electronic interface without having to reprogram the robots 2, 3. In this regard, the second robot 3 may comprise on-board an acoustic device configured to record the effective reproduction of voice files activated by touching certain icons/commands of the infotainment system.

Still considering the preliminary step wherein the characteristics of the various components of the apparatus 1 are defined (for example, the types of robots 2, 3), an operator may select different sets of preliminary calibrations already performed previously, linked to test cycles already performed previously. Of course, as will be indicated below, an operator may start a calibration step from scratch, in the case of changes relating to the apparatus 1 (for example, the dimensions of the robots 2, 3), and/or to the type of motor-vehicle, and therefore to the reference points of the robots 2, 3 with respect to the position of the system to be tested.

The following description describes the preliminary calibration operations which are carried out prior to the test operations, if the coordinates for operation have not yet been stored.

The preliminary calibration operations make it possible to reconstruct the position in the space of some fundamental points relating to the apparatus 1 and to the vehicle V, necessary for the correct execution of the tests. Once the preliminary calibration operation has been completed, the equipment 1 has in memory the coordinates of the points and the fundamental distances between the robots 2, 3 and the vehicle V, to carry out the test operations on the infotainment system automatically, without the need for manual assistance by an operator.

In one or more embodiments, the preliminary calibration operations comprise the following steps:

specifying the dimensions of a touch screen D, defining the area within which the second robot 3 must have interactions, positioning a recognition element 6 on a side window B of the vehicle V, so as to identify the entry point of the second robot 3 into the passenger compartment of the motor-vehicle. It should be noted that the recognition element 6 may be made in the form of a specific two-dimensional shape automatically recognizable by the camera 5 or a QR code readable by the camera 5, which can be applied to the motor-vehicle V by means of an adhesive layer.

In one or more embodiments, the preliminary calibration procedure further comprises the step of collecting a series of images by means of the aforesaid video camera 5, in which the marker 6 is framed in various positions, so as to store the entry point into the motor-vehicle v.

In one or more embodiments, a further step of the calibration procedure may comprise the step of identifying the position of the video camera 5 with respect to a flange of the second robot 3, which connects the actuation means 4 to the wrist 34. This step may be implemented by applying a further marker that can be positioned at will at a point in the space that is easily reachable with the second robot 3, for example, on a planar surface inside the cockpit.

Further calibration steps are indicated below in the description which must be carried out inside the motor-vehicle V, in particular to define the position of the dashboard C of the motor-vehicle V, so as to be able to understand the position of the screen D of the infotainment system. To proceed with these calibration steps inside the passenger compartment, the second robot 3 is manually positioned inside the motor-vehicle V, in a position such as to be able to frame with the video camera 5 a further recognition “marker” calibration element 9 applied to the dashboard C near the screen. Subsequently, the position of the touch screen D is defined by means of an additional temporary marker positioned in the center of the screen (not shown in the drawings). Once the position from the aforesaid markers has been acquired, the calibration operations are terminated, as the positions useful for carrying out the test operations are stored in the memory of the electronic control unit E.

The test operations may comprise:

selecting different icons displayed on the touch screen D, in a predetermined order, to check the correct operation of the system, selecting various buttons and/or adjustment sliders and/or control icons and/or scrolling various multimedia pages of the screen and/or testing various buttons also present on the dashboard C and/or on the steering wheel.

Thanks to the characteristics described above, the apparatus according to the invention allows a plurality of test operations to be performed on the infotainment system in an extremely intuitive way, regardless of the type of motor-vehicle on which the system is fitted, directly in the passenger compartment, without having to prepare specific test benches of the infotainment system and/or remove automotive parts to proceed with the test operations.

Of course, without prejudice to the principle of the invention, the details of construction and the embodiments may vary widely with respect to those described and illustrated purely by way of example, without departing from the scope of the present invention.

The invention claimed is:

1. A method for automatically testing an infotainment system of a motor-vehicle comprising the following steps:

providing an apparatus comprising:

a first multi-axis articulated robot comprising a chain of robot elements mutually articulated and ending with a robot wrist;

a second multi-axis articulated robot mounted on the wrist of the first robot, wherein said second robot is configured for entering into a passenger compartment of the motor-vehicle;

actuation means supported by said second robot and configured for performing a plurality of test operations of the infotainment system of the motor-vehicle, wherein said actuation means comprise an element provided for interacting with a touch screen of the infotainment system;

at least one video camera arranged on-board the second robot, configured to acquire data inside the passenger compartment of the motor-vehicle, during an execution step of the plurality of test operations of the infotainment system; and an electronic control unit, said method comprising driving an implementation step comprising a sequence of the plurality of test operations to be performed on the infotainment system by said actuation means, wherein said second robot enters into the passenger compartment of the motor-vehicle, to access the infotainment system to be tested, in such a way that said apparatus is configured to perform the plurality of test operations directly inside the passenger compartment of the motor-vehicle, without having to provide test benches for the infotainment system or removing motor-vehicle parts to access the infotainment system.

2. The method according to claim 1, further comprising:

performing a preliminary calibration step of the apparatus to acquire data inside the passenger compartment of the motor-vehicle;

during said preliminary calibration step, storing in a memory coordinates of the motor-vehicle and the infotainment system with respect to the first and the second robots, according to different operating positions of the first and the second robots.

3. The method according to claim 2, wherein said preliminary calibration step is carried out with the aid of CAD software including mathematics of the motor-vehicle and the infotainment system to be tested.

4. The method according to claim 1, further comprising providing at least one marker recognition element arranged at a predetermined position of the motor-vehicle, which can be viewed by said at least one video camera to perform said preliminary calibration step.

5. The method according to claim 4, wherein said preliminary calibration step further comprises:

arranging said marker recognition element at a side window of the motor-vehicle, in order to detect an entry point of the second robot into the passenger compartment of the motor-vehicle;

acquiring a plurality of images by said video camera, wherein the marker recognition element is framed according to different positions and storing in the memory the entry point into the motor-vehicle for the second robot;

carrying out additional calibration steps inside the passenger compartment of the motor-vehicle to define a position of the dashboard of the motor-vehicle, in order to learn a position of the touch screen of the infotainment system.

6. The method according to claim 5, wherein said additional calibration steps inside the passenger compartment of the motor-vehicle comprise positioning the second robot inside the motor-vehicle, at a position adapted to frame with the video camera a further marker recognition element applied on the dashboard near the touch screen.

7. The method according to claim 1, wherein said implementation step comprises:

selecting different icons displayed on the touch screen, in a predetermined order, to check the correct functioning of the system; and selecting at least one of different buttons or adjustment sliders or control icons or scrolling different multimedia pages on the touch screen or testing different components on the dashboard or on a motor-vehicle steering wheel or collecting data from a motor-vehicle control unit or playing multimedia files or performing "text-to-speech" vocal synthesis operations or performing sound identification steps, composing texts from a keyboard.

8. The method according to claim 1, wherein the first robot and the second robot are driven into a position prior to entering into the passenger compartment, wherein the second robot is oriented perpendicularly to a side of the motor-vehicle, in the direction of an entry point into the passenger compartment, determined by an opening of the side window of the motor-vehicle.

9. The method according to claim 1, further comprising a preliminary configuration step of the apparatus, comprising defining a new test case including a new sequence of the plurality of test operations to be performed on the infotainment system by said actuation means, during the implementation step.

10. The method according to claim 9, further comprising the step of redefining said sequence of the plurality of test operations using an electronic interface without reprogramming said robots.

11. The method according to claim 1, wherein said second robot comprises a collaborative robot having a sensorized cover configured to automatically stop the second robot in cases of close proximity or contact with a foreign body.

12. The method according to claim 1, further comprising the step of automatically generating a plurality of reports indicative of the plurality of test operations performed on the infotainment system during said implementation step, to evaluate any operating anomalies of the infotainment system.

13. An apparatus for automatically testing an infotainment system of a motor-vehicle, comprising:

a first multi-axis articulated robot comprising a chain of robot elements mutually articulated and ending with a robot wrist;

a second multi-axis articulated robot mounted on the wrist of the first robot, wherein said second robot is configured for entering into a passenger compartment of the motor-vehicle;

actuation means supported by said second robot, configured for performing a plurality of test operations of the infotainment system of the motor-vehicle, wherein said actuation means comprise an element provided for interacting with a touch screen of the infotainment system;

at least one video camera arranged on-board the second robot, configured to acquire data inside the passenger compartment of the motor-vehicle, during an execution step of the infotainment system test operations; and an electronic control unit, configured for driving an implementation step including a sequence of the plurality of test operations to be performed on the infotainment system by said actuation means, in such a way that said apparatus is configured to perform the plurality of test operations of the infotainment system directly inside the passenger compartment of the motor-vehicle, without having to provide test benches for the infotainment system or removing motor-vehicle parts to access the infotainment system.

14. The apparatus according to claim 13, wherein the first multi-axis articulated robot comprises:

a base and a column rotatably mounted on the base around a first axis directed vertically;

an arm pivotally mounted on the column around a second axis directed horizontally;

a forearm pivotally mounted on said arm around a third axis directed horizontally; and a wrist mounted on the forearm configured for rotating around two mutually orthogonal axes.

15. The apparatus according to claim 14, wherein said second robot is mounted on the wrist of the first robot by a connection flange, and is configured to pass through an opening of a side window of the motor-vehicle.

16. The apparatus according to claim 13, wherein said second articulated robot comprises a collaborative type robot, having a sensorized cover to automatically stop the second robot in cases of close proximity or contact with a foreign body.

17. The apparatus according to claim 13, wherein said actuation means comprise:

a supporting body connected to a wrist of the second robot; and a pair of robotic fingers, wherein each finger supports a terminal element equipped with a covering film configured to at least one of touch or scroll on the touch screen of the infotainment system.

18. The apparatus according to claim 13, wherein said actuation means comprise a support arm, on which a terminal element is mounted at a distal end, configured to stress the infotainment system to be tested, wherein an elastically yielding spring element is arranged within the support arm, axially arranged along the support arm.

19. The apparatus according to claim 13, wherein said second robot further comprises a sound device configured to record a playback of voice files actuated by touching determined at least one of icons or controls of the infotainment system.

20. A work cell including an apparatus according to claim 13 and a motor-vehicle comprising an infotainment system to be tested by said apparatus.

* * * * *